United States Patent
Ahmed et al.

(10) Patent No.: US 10,919,542 B2
(45) Date of Patent: Feb. 16, 2021

(54) APPARATUS AND METHOD FOR PROVIDING A KINESTHETIC CUE IN A DRIVING AUTOMATION EQUIPPED VEHICLE

(71) Applicant: GM GLOBAL TECHNOLOGY OPERATIONS LLC, Detroit, MI (US)

(72) Inventors: Sami Ahmed, Orion Township, MI (US); Charles A. Green, Canton, MI (US); Kevin A. O'Dea, Ann Arbor, MI (US); Daniel B. Cutler, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 225 days.

(21) Appl. No.: 16/145,381

(22) Filed: Sep. 28, 2018

(65) Prior Publication Data

US 2020/0101985 A1  Apr. 2, 2020

(51) Int. Cl.
| | | |
|---|---|---|
| *G01C 22/00* | (2006.01) | |
| *G05D 1/00* | (2006.01) | |
| *B60W 50/16* | (2020.01) | |
| *B60W 30/18* | (2012.01) | |
| *B60W 50/10* | (2012.01) | |

(52) U.S. Cl.
CPC ...... *B60W 50/16* (2013.01); *B60W 30/18163* (2013.01); *B60W 50/10* (2013.01); *G05D 1/0088* (2013.01); *G05D 2201/0213* (2013.01)

(58) Field of Classification Search
CPC ........... B60W 50/16; B60W 30/18163; B60W 50/10; B60W 30/146; B60W 10/04; B60W 10/18; B60W 10/20; B60W 30/12; G05D 1/0088; G05D 2201/0213
USPC .......................................................... 701/23
See application file for complete search history.

(56) References Cited

U.S. PATENT DOCUMENTS

| | | | |
|---|---|---|---|
| 2010/0082195 A1* | 4/2010 | Lee ........................ | G01C 21/12 701/25 |
| 2017/0334446 A1* | 11/2017 | Bosch .................... | G08G 1/167 |
| 2017/0349175 A1* | 12/2017 | Brandin ................ | B60W 50/16 |
| 2018/0118223 A1* | 5/2018 | Mori ...................... | B60K 35/00 |
| 2018/0281854 A1* | 10/2018 | Talamonti ............. | B60W 30/09 |
| 2019/0071098 A1* | 3/2019 | Asakura ............... | B60W 30/025 |

* cited by examiner

*Primary Examiner* — Mahmoud S Ismail
(74) *Attorney, Agent, or Firm* — Lorenz & Kopf, LLP

(57) ABSTRACT

The present application generally relates to a method and apparatus for driving automation control of a motor vehicle. In particular, the system is operative to determine a vehicle maneuver, such as a lane change, and provide a first kinesthetic cue to a supervisory driver or vehicle occupant indicating the start of a vehicle maneuver. The system and method are then operative to complete the vehicle maneuver and provide a second kinesthetic cue indicating the completion of the vehicle maneuver.

18 Claims, 3 Drawing Sheets

APPARATUS AND METHOD FOR PROVIDING A KINESTHETIC CUE IN A DRIVING AUTOMATION EQUIPPED VEHICLE

BACKGROUND

The present disclosure relates generally to operation of a driving automation equipped vehicle and driver notification of upcoming vehicle maneuvers. More specifically, aspects of the present disclosure relate to systems, methods and devices for determining an upcoming vehicle maneuver, generating a kinesthetic cue in order to alert a driver of the vehicle maneuver initiation and/or vehicle maneuver completion.

Driving automation equipped vehicles operate with various levels of automation, generally characterized by five levels, such as level one having the least automation, such as adaptive cruise control, to level five having complete automation capability. During operation it would be desirable for a driver to visually determine if a maneuver is safe before it is performed by the driving automation equipped vehicle. It may be difficult for a driver to predict the maneuvers made by the automation equipped vehicle and this may impact the ability of the driver to perform their supervisory roles. When a vehicle is initiating a lane change operation, a driver many not know exactly when a vehicle is leaving the current lane of travel and may not have the opportunity to double check if the destination lane is clear. It would be desirable to enable the driving automation system to notify the driver in a manner which intuitively led the driver to make those checks at the most beneficial times.

The above information disclosed in this background section is only for enhancement of understanding of the background of the invention and therefore it may contain information that does not form the prior art that is already known in this country to a person of ordinary skill in the art.

SUMMARY

Disclosed herein are driving automation methods and systems and related control logic for provisioning vehicle steering and braking control systems, methods for making and methods for operating such systems, and motor vehicles equipped with onboard control systems. By way of example, and not limitation, there is presented various embodiments of a generating a kinesthetic output for an automated vehicle control system are disclosed herein.

In accordance with an aspect of the present invention a method of controlling a vehicle comprising receiving a lane change request, activating a first kinesthetic cue and performing a lane change maneuver in response to the lane change request.

In accordance with another aspect of the present invention an apparatus for controlling a vehicle comprising a vehicle controller for performing a lane change maneuver in response to a response control signal and generating a first control signal indicative of the lane change maneuver, and a notification processor for generating a first kinesthetic cue in response to the first control signal.

In accordance with another aspect of the present disclosure, an apparatus comprising a vehicle controller for performing a lane change maneuver in response to a vehicle control signal, a haptic device for delivering a first kinesthetic cue in response to a first haptic control signal and a second kinesthetic cue in response to a second haptic control signal, and a processor for receiving a request to perform the lane change maneuver generating a first haptic control signal prior to executing the lane change maneuver, generating the vehicle control signal, and generating a second haptic control signal in response to a completion of the lane change maneuver.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Figure 1:
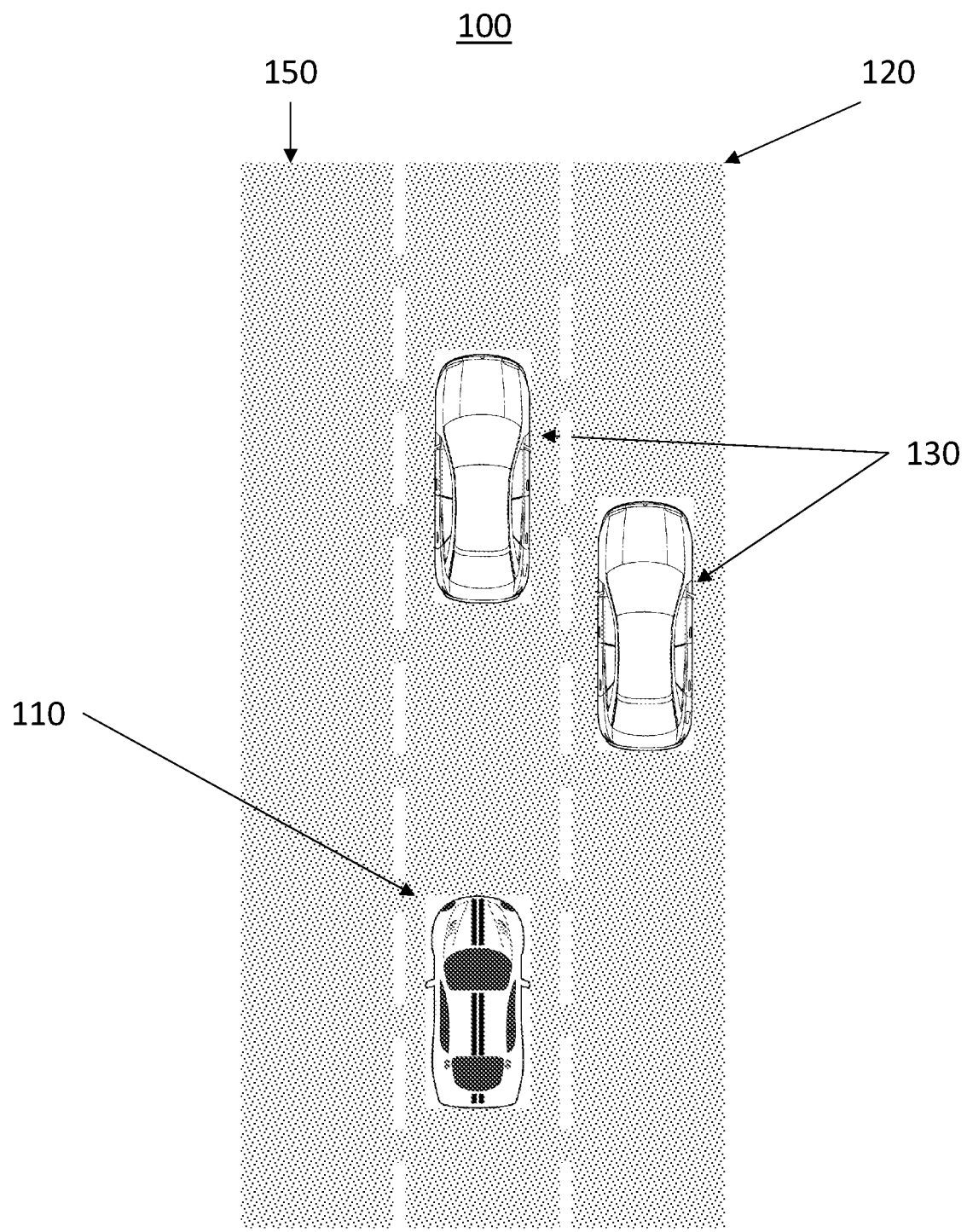
FIG. 1 schematically illustrates an exemplary application of the method and apparatus for driver notification of vehicle maneuver via kinesthetic cue in a vehicle according to an exemplary embodiment.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back,"

"left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

FIG. 1 schematically illustrates an exemplary application of the method and apparatus for driver notification of vehicle maneuver via kinesthetic cue in a vehicle 100 according to the present disclosure. In this exemplary embodiment, a driving automation equipped vehicle control system controlling a first vehicle 110 is employed to navigate a route including a three-lane unidirectional roadway 120. In the situation depicted in the FIG. 1, if the first vehicle 110 is travelling at a speed greater than the leading vehicles 130, the vehicle control system is presented with the option of reducing the speed of the first vehicle in order to match with the speed of the leading vehicles 130, or may change lanes to the leftmost lane 150 and continue traveling at the original speed. At this point, according to an exemplary embodiment of the present disclosure, the vehicle control system may notify a vehicle occupant of the lane change maneuver.

During an automated lane change maneuver, the driver of the vehicle may not be aware of exactly when the driving automation equipped vehicle initiates unexpected maneuvers, and so may not have the opportunity to double check the safety of the maneuver according to their supervisory role. In addition, during an automated lane change maneuver it may be unsettling for an occupant of the vehicle, when the autonomous vehicle initiates unexpected maneuvers. To address this problem, one exemplary embodiment of the present disclosure teaches generation of a notification profile when performing the maneuver to indicate the beginning of the maneuver and providing opportunity for a driver or vehicle occupant to check the safety of the maneuver. The notification may have one or two stages. For example, when a vehicle is operating under an automated mode and initiates a lane change maneuver, the maneuver may be segmented into two stages. The first stage will initiate the lane change and the second will complete the lane change. The first stage lets the driver know that the lane change is beginning. The second stage completes the lane change. In this exemplary embodiment, the first stage of the lane change could take several forms. For example, the first stage may move the vehicle in the lane from its current position either in the same direction as the lane change to be performed or the opposite direction. Alternatively, the first stage may move the vehicle in the lane from its current position and then back toward the center of the current lane. The first stage may move a steering wheel, engage a kinesthetic feedback or other short movement. The second stage completes the lane change from the vehicle's position after stage one to the new lane.

Figure 2:
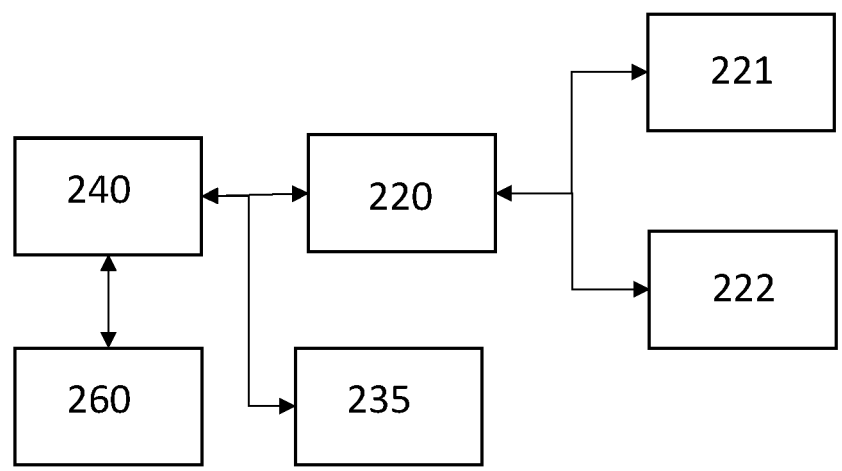
FIG. 2 shows a block diagram illustrating an exemplary system for driver notification of vehicle maneuver via kinesthetic cue in a vehicle according to an exemplary embodiment.

Turning now to FIG. 2, a block diagram illustrating an exemplary system for driver notification of vehicle maneuver via kinesthetic cue in a vehicle 200 is shown. The exemplary system may have a haptic steering wheel 221, a haptic seat 222, a haptic processor 220, a vehicle processor 240, a vehicle controller 260 and a user interface 235. In an exemplary application, the vehicle processor 240 is operative to determine the need for a vehicle maneuver which may vary from current operation.

When the vehicle processor 240 determines that a vehicle maneuver is desired, such as a lane change, the vehicle processor is first operative to generate an initial control signal indicating the vehicle maneuver and couple this initial control signal to the haptic processor 220. The haptic processor 220 is then operative to generate a first haptic control signal and couple this first haptic control signal to a haptic device, such as a haptic steering wheel 221 or a haptic seat 222. The haptic processor 220 may then generate a confirmation signal and couple this confirmation signal to the vehicle processor 240 in order to confirm that the first stage of the notification has been completed.

The vehicle processor 240 is then operative to generate a vehicle control signal representative of the vehicle maneuver and couple this vehicle control signal to the vehicle controller 260. The vehicle controller 260 is then operative to generate the various component control signals to couple to the controllable devices such as steering systems, braking systems, acceleration and the like. Once the vehicle maneuver has been performed, the vehicle controller 260 may be operative to return a confirmation signal to the vehicle processor 240 indicating that the vehicle maneuver has been performed. The vehicle processor 240 may alternatively, or in concert, with the confirmation signal, determine that the vehicle maneuver has been performed using vehicle sensors and other data.

When the vehicle processor 240 establishes that the vehicle maneuver has been completed, the vehicle processor 240 is then operative to generate a second stage control signal indicating the vehicle maneuver completion and couple this secondary control signal to the haptic processor 220. The haptic processor 220 is then operative to generate a second haptic control signal and couple this second haptic control signal to the haptic device, such as a haptic steering wheel 221 or a haptic seat 222. The haptic processor 220 may then generate a second confirmation signal and couple this second confirmation signal to the vehicle processor 240 to confirm that the second stage of the notification has been completed.

In addition, the vehicle processor 240 may generate a user interface signal indicative of the vehicle maneuver and the user notification and couple this information to a user interface 235. The user interface 235 may simultaneously show a visual indicator and/or an audio indicator indicative of the vehicle maneuver initiation and completion.

The kinesthetic cue may be used to alert a supervisory driver of a driving automation equipped vehicle, such as a vehicle with an adaptive cruise control function, of an upcoming maneuver to provide the driver with an opportunity to assess the safety of the upcoming maneuver. For example, if the driving automation system is to initiate a lane change to the left, the kinesthetic cue may be initiated, prompting the driver to check the left lane for other vehicles. The driver may then opt to take control of the vehicle in order to prevent the lane change. Alternatively, the driving automation system may wait for a response from the driver before initiating the maneuver, such as an audible response, a movement of the steering wheel, an application of a gas or brake pedal or a button push on a user interface. The driving automation system may also monitor the driver's head position in order to determine if a visual check of the lane has been made by the driver.

Figure 3:
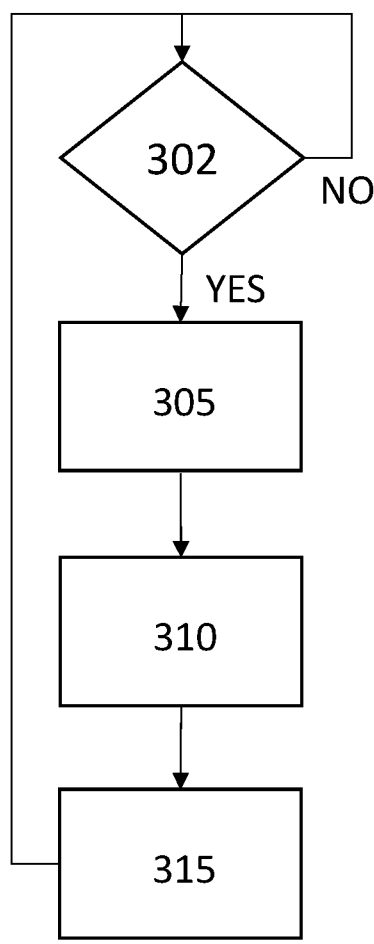
FIG. 3 shows a flowchart illustrating an exemplary method for driver notification of vehicle maneuver via kinesthetic cue in a vehicle according to an exemplary embodiment.

Turning now to FIG. 3, a flowchart illustrating an exemplary method for driver notification of vehicle maneuver via kinesthetic cue in a vehicle 300 is shown. The method is first operative to monitor for a vehicle maneuver corresponding to a need for a user cue 302. The vehicle maneuver may correspond to a lane change, exiting a highway at an off ramp, making a turn, accelerating, or decelerating or the like.

If the appropriate vehicle maneuver is to be performed, the method is first operative to generate an initial kinesthetic cue control signal 305 for coupling to the vehicle control system, vehicle steering, and/or vehicle braking system. The kinesthetic cue may include a unique kinesthetic cue corresponding to the specific vehicle maneuver. For example, a lane change towards the left may start with a different kinesthetic cue than a lane change towards the right. The kinesthetic cue may include slightly moving the steering wheel, vibration or movement of a vehicle pedal or moving the vehicle within the lane. For example, before initiating a lane change towards the left, the method may move the vehicle towards the left in the lane, return the vehicle to the center of the lane, and then initiate the lane change to the left. Alternatively, the kinesthetic cue may include activating haptic devices, such as a haptic steering wheel or a haptic seat Once the initial kinesthetic cue had been performed, the method is then operative to execute the vehicle maneuver 310. Once the vehicle maneuver has been completed, the method is then operative to generate a second kinesthetic cue control signal 315 in order to indicate to a supervisory driver that the vehicle maneuver has been completed. The method is then operative to return to monitoring vehicle maneuvers 302.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of controlling a vehicle comprising:
   receiving a lane change request;
   activating a first kinesthetic cue in response to the lane change request wherein the first kinesthetic cue is performed by moving the vehicle within a lane in the direction of the lane change maneuver and back to a center of the lane; and
   performing a lane change maneuver in response to a performance of the kinesthetic cue.

2. The method of claim 1 further comprising activating a second kinesthetic cue in response to completing the lane change maneuver.

3. The method of claim 2 wherein the second kinesthetic cue is used to notify a vehicle occupant of a completion of the lane change maneuver.

4. The method of claim 2 wherein the first kinesthetic cue and the second kinesthetic cue correspond to a first kinesthetic profile indicative of a direction of the lane change maneuver.

5. The method of claim 1 wherein the first kinesthetic cue is used to notify a vehicle occupant of the lane change maneuver.

6. The method of claim 1 wherein the lane change maneuver is performed by a vehicle controller.

7. The method of claim 1 wherein first kinesthetic cue is performed by a haptic seat.

8. The method of claim 1 wherein the first kinesthetic cue is performed by a haptic steering wheel.

9. The method of claim 1 wherein the first kinesthetic cue is performed by moving the vehicle within a lane in the direction of the lane change maneuver.

10. An apparatus comprising:
    a vehicle processor configured for generating a first control signal indicative of the lane change maneuver in response to a lane change request;
    a notification processor for generating a first kinesthetic cue in response to the first control signal wherein the first kinesthetic cue is performed by moving a vehicle within a lane in the direction of the lane change maneuver and back to a center of the lane; and
    a vehicle controller for performing a lane change maneuver in response to a performance of the kinesthetic cue.

11. The apparatus of claim 10 wherein the vehicle processor is operative to generate a second control signal indicative of a completion of the lane change maneuver, and wherein the notification processor is operative to generate a response control signal indicative of a completion of the first kinesthetic cue and to generate a second kinesthetic cue in response to the second control signal.

12. The apparatus of claim 11 wherein the second kinesthetic cue is used to notify a vehicle occupant of a completion of the lane change maneuver.

13. The apparatus of claim 11 wherein the first kinesthetic cue and the second kinesthetic cue correspond to a first kinesthetic profile indicative of a direction of the lane change maneuver.

14. The apparatus of claim 10 wherein the vehicle controller performs the lane change maneuver in response to the performance of the first kinesthetic cue and a vehicle control signal from a driving automation equipped vehicle control system.

15. The apparatus of claim 10 wherein the first kinesthetic cue is used to notify a vehicle occupant of the lane change maneuver.

16. The apparatus of claim 10 wherein first kinesthetic cue is performed by at least one of a haptic seat and a haptic steering wheel.

17. The apparatus of claim 10 wherein the first kinesthetic cue is performed by moving a vehicle within a lane in the direction of the lane change maneuver.

18. An apparatus comprising:
    a vehicle controller for performing a lane change maneuver in response to a vehicle control signal;
    a haptic device for delivering a first kinesthetic cue in response to a first haptic control signal and a second kinesthetic cue in response to a second haptic control signal, wherein the first kinesthetic cue is performed by moving a vehicle within a lane in the direction of the lane change maneuver and back to a center of the lane; and
    a processor for receiving a request to perform the lane change maneuver generating a first haptic control signal prior to executing the lane change maneuver, generating the vehicle control signal in response to a performance of the first kinesthetic cue, and generating a second haptic control signal in response to a completion of the lane change maneuver.

* * * * *